March 14, 1944. H. A. HOKE ET AL 2,344,041
VALVE
Filed Jan. 19, 1943
FIG_1_
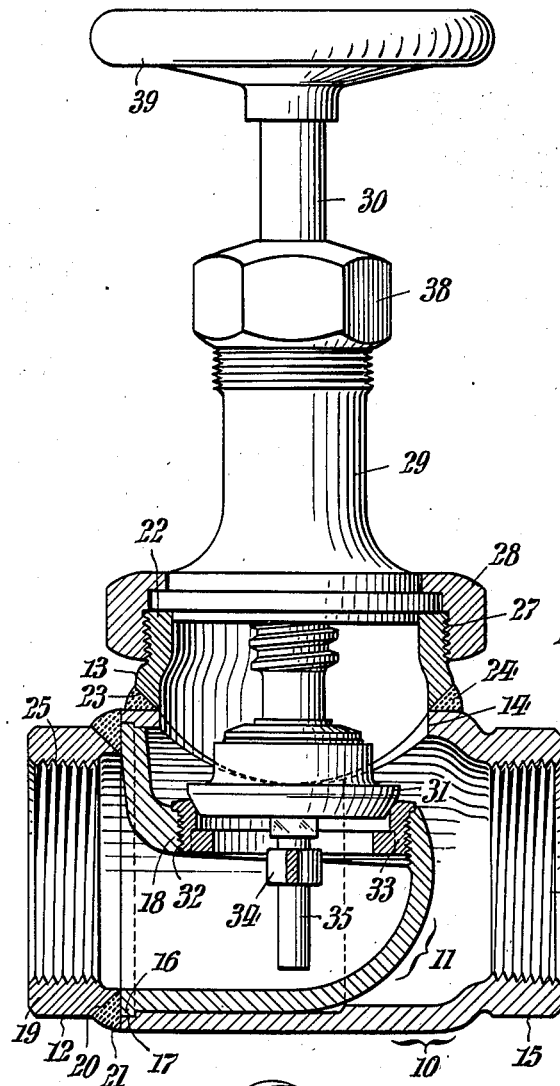
FIG_2_
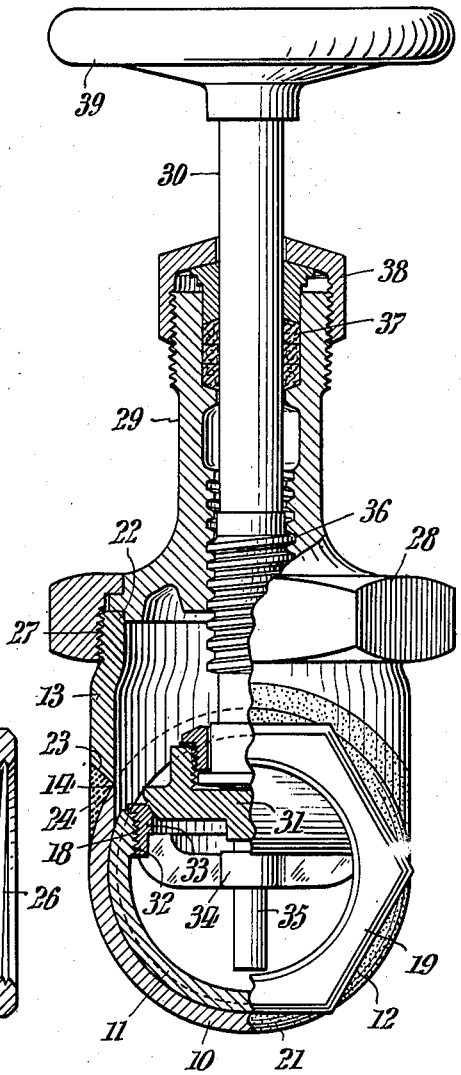
FIG_3_
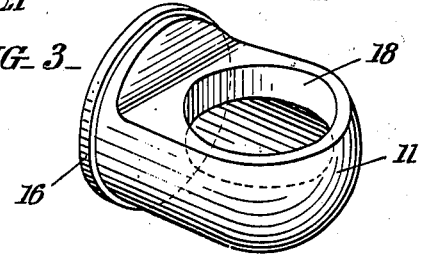
INVENTORS:
Harry A. Hoke &
Joseph F. Matteo,
BY
ATTORNEYS.

Patented Mar. 14, 1944

2,344,041

UNITED STATES PATENT OFFICE 2,344,041

VALVE

Harry A. Hoke, Altoona, and Joseph F. Matteo, Philadelphia, Pa., assignors to The Pennsylvania Railroad Company, Philadelphia, Pa., a corporation of Pennsylvania Application January 19, 1943, Serial No. 472,814

2 Claims. (Cl. 251—156)

This invention relates to valves, and has reference more especially to valves of the globe and angle types.

The chief aim of our invention is to make possible expeditious and economic construction of valves, particularly of the kinds above referred to, from parts which can be readily fashioned from wrought stock material such as seamless tubing, and secured together in assembled relation by welding.

How the foregoing and other objects and attendant advantages are realized in practice will appear from the following detailed description of the attached drawing, wherein Fig. 1 is a view partly in side elevation and partly in longitudinal section, of a globe type valve constructed in accordance with our invention.

Fig. 2 is a view partly in end elevation and partly in cross section, of the valve shown in Fig. 1.

Fig. 3 is a perspective view of one of the component parts of the body of the valve.

Referring to the drawing, the globe type valve there illustrated has its body made up from four parts or components which are respectively designated by the numerals 10, 11, 12 and 13, and which are all fashioned from suitably cut lengths of wrought seamless tubing. As shown, the main body component 10 has a lateral opening 14 at the top thereof, and is formed at one end with a polygonal head 15. The second or inner component 11 of the valve body, separately illustrated in Fig. 3, is die-pressed or otherwise fashioned to the longitudinal sectional configuration shown in Fig. 1, and at its inner portion, to the semi-circular cross section shown in Fig. 2. It is to be noted that the inner component 11 snugly fits into the main component 10, being positioned with its outer end flush with the end of said main component, opposite to the head end 15. Such allocation of the inner component 11 is determined through coaction between the annular shoulder 16 thereon with a shouldered annular recess 17 within the outer component. This construction is advantageous in that it facilitates assembling, with assurance of coaxial alignment of a seat aperture 18 in the top of the inner component 11 with the top opening 14 of the main component 10. The third component 12 of the valve body is in the form of a nut which is abutted against the flush ends of the main and inner components 10 and 11, and which serves as an extension of the valve body and provides the other polygonal end head 19 therefor. The inner face of the extension component 12 is beveled as at 20 to afford an annular channel for weld metal 21 by which the three body components 10, 11 and 12 are integrally united. The fourth component 13 of the valve body provides an upward neck 22 in coaxial relation to the top opening 14 in the main component 10, its inner or bottom edge being beveled as at 23 to form with the top edge of said main component, an annular channel for uniting weld metal 24. As shown, the head ends 12 and 15 of the valve body are internally threaded as at 25 and 26 for screw connection of piping, while the neck 22 is externally threaded as at 27 for screw connection of a hold-down ring nut 28 for the bonnet 29 through which the actuating stem 30 of the valve closure member 31 passes. In the illustrated instance the seat aperture 18 in the top of the inner component 11 of the valve body is internally threaded as at 32 to receive a replaceable seat member 33 for the valve closure member 31. As shown, the seat member 33 has the form of a spider with a central apertured boss 34 for guiding a pendent axial stud projection 35 of the closure member 31 after more or less customary practice in globe valve construction. Also as usual, the stem 30 has threaded engagement at 36 with the axial bore of the bonnet 29; and compressible packing 37 retained by a gland nut 38 is provided to prevent fluid leakage around said stem where it emerges from the bonnet. Further as usual, the stem 30 is fitted with a hand wheel 39 by means of which the valve can be opened and closed manually.

From the foregoing it will be seen that the valves of our invention can be readily and quickly assembled, and united by welding with resultant provision of bodies which are stronger and more sturdy for capacity to withstand higher pressures than valves as ordinarily constructed with cast bodies.

Having thus described our invention, we claim:

1. A globe valve having a body constructed throughout from wrought tubular stock, including a main cylindric component with a lateral opening; an inner component to fit within the main component having the configuration of an elbow with one of its ends flush with one end of the main component and with its other end upturned and providing a seat aperture for a stemmed closure member in axial alignment with the lateral opening in the main component; a cylindric extension component with a beveled edge abutted directly against the outer end of the inner component with resultant formation of a surrounding channel in which annular surfaces of all three aforesaid components are exposed; weld metal filling the channel and permanently uniting the three components; and a cylindrical neck component having a beveled edge which is similarly abutted against the main component around the lateral opening of the main component and welded to the latter for attachment of a bonnet for the stem of the closure member.

2. A globe valve in accordance with claim 1, in which the position of the inner component is determined by engagement of an annular shoulder thereon within an annular recess at the end of the main component at the region where these parts are welded to each other and to the extension component.

HARRY A. HOKE.
JOSEPH F. MATTEO.